Aug. 21, 1928.
M. M. SIMESCU
1,681,688
TRIMMING AND CUTTING TOOL
Filed Aug. 31, 1927
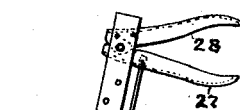
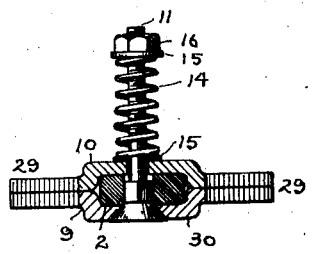
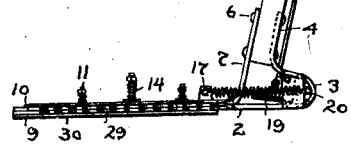
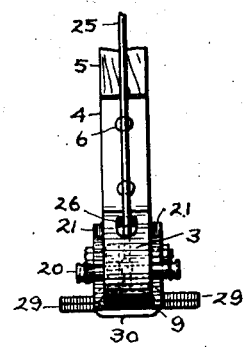
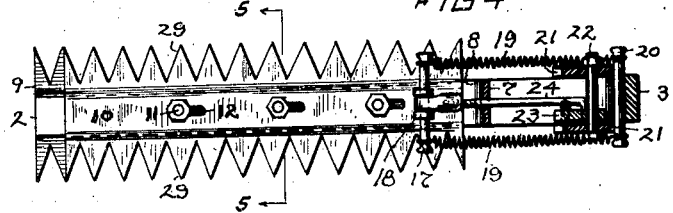
Inventor
MARIN M. SIMESCU
By Fisher, Moser & Moore
Attorney Patented Aug. 21, 1928.

1,681,688

UNITED STATES PATENT OFFICE.

MARIN M. SIMESCU, OF YOUNGSTOWN, OHIO.

TRIMMING AND CUTTING TOOL.

Application filed August 31, 1927. Serial No. 216,573.

My invention relates to trimming and cutting tools, and more particularly to a tool for cutting grass, edging a lawn, and trimming the growth around the base of trees, fences and other obstacles. As constructed the tool is adapted to be handled with ease and comfort by a person standing upright or while walking, and to permit the grass to be trimmed on opposite sides of a tree or other object without requiring the operator to shift his own position relatively to the tree or object. The tool is also simply constructed to permit convenient assembly, ease of operation, separability for sharpening and repairs, and to provide a narrow flat elongated cutter head capable of cutting for a substantial distance on a straight line at each side thereof.

In the accompanying drawing Fig. 1 is a side elevation of the complete tool on a reduced scale, it being understood that the handle extends upwardly to approximately the height of the hips or convenient reach of the person operating the same. Fig. 2 is an enlarged sectional view of the cutter head or base part of the tool, and Fig. 3 is a rear view thereof. Fig. 4 is a top view of the parts shown in Fig. 2. Fig. 5 is an enlarged cross section of the cutter head on line 5—5 of Fig. 4.

The tool comprises a horizontal base member 2 in the form of a metal bar having a round bend or heel portion 3 which terminates in a straight upwardly and rearwardly-inclined extension 4 containing bolt opening whereby the member may be rigidly secured to an inclined handle bar 5 by bolts 6. A short brace 7 is secured by the same bolts 6 to the front face of bar 5, and the bottom part of the brace is bent forwardly to serve as a cutter bar stop 8 where it bears against the top of horizontal bar 2. Two co-operating cutter bars 9 and 10 respectively, are connected with main bar 2, each being channeled lengthwise and the channeled surfaces being placed together to receive and hold bar 2, see Fig. 5. The lower cutter bar 9 is fixed immovably to bar 2 by short vertical bolts 11, and the upper cutter bar 10 is provided with longitudinal slots 12 for the bolts 11 to permit the bar to be reciprocated within limits. Coiled compression springs 14 are sleeved over bolts 11 between washers 15, and nuts 16 serve to place the springs under tension and to lock the parts together. A cross pin 17 is fixed within lugs 18 at the rear end of upper cutter bar 10, and a pair of coiled contracting springs 19 extend rearwardly from the opposite ends of the pin to a second cross pin 20 which is held within heel 3 of main bar 2 by a pair of side plates 21, see Fig. 4. A bolt 22 may be used to clamp the side plates 21 to heel 3, or some other mode of fastening may be employed instead. A bell crank member 23 is rotatably mounted upon bolt 22, and a short link 24 connects said member with cross pin 17 to permit cutter bar 10 to be reciprocated thereby by means of bell crank 23 and springs 19. A connecting rod 25 extends upwardly from bell crank 23 through an opening 26 in heel 3 and thence parallel with the handle bar to an operating handle or hand grip 27 which is pivotally secured to the upper end of handle bar and extends rearwardly therefrom adjacent a rigid handle or hand grip 28. The tool is carried and operated by the fingers of one hand, and the angle of inclination of the handle bar facilitates the placement of the cutter bar head parallelly with the ground as cutting and trimming operations proceed and the operator moves forwardly without bending or stooping. To facilitate cutting or trimming operations at either the right or left side of the operator and to right and left side of an object in the path of the cutter head, the cutter bars are provided with lateral cutting teeth 29 at their opposite edges in the same plane as main bar 2. The cutting teeth on bottom bar 9 are raised slightly relatively to the bottom 30 of the channeled part of the bar which bottom serves as a rider or runner for the tool as it rests upon the grass, although the tool may also be carried and operated apart from the ground whenever occasion requires, the complete tool being relatively light in weight and easily supported in one hand.

What I claim is:

1. A trimming and cutting tool, comprising a vertically-inclined handle bar having a horizontal bar affixed to its lower end, a pair of cutter bars detachably secured to said horizontal bar, one of said cutters being reciprocable, a crank member mounted upon said main bar, a link connecting said crank member and reciprocable cutter bar, a spring member adapted to co-act with said crank member in operating said reciprocable cutter bar, an operating handle mounted upon said handle bar, and a connecting rod extending from said handle to said crank member.

2. A trimming and cutting tool, comprising a horizontal main bar, a pair of channeled cutter bars sleeved upon and secured to said main bar, a handle-bar affixed to said main bar, and means connected with said bars for reciprocating one of said cutter bars.

3. A trimming and cutting tool, comprising a horizontal bar and cutter bars affixed thereto, a handle bar secured to one end of said horizontal bar having a brace member bearing against the top of said horizontal bar, one of said cutter bars being reciprocable and having stop relation with said brace member, a spring and crank means for reciprocating said reciprocable cutter bar, and a handle extending from said handle bar having operating connection with said crank means.

4. A trimming and cutting tool, comprising a horizontal bar having a bent heel portion and a vertical extension, a handle bar affixed to said extension, a brace member for said horizontal bar secured to said handle bar, a rigid and pivoted handle attached to the upper end of said handle bar, a crank member within the heel portion of said horizontal bar, a connecting rod extending from said crank member to the pivoted handle, stationary and movable cutter bars secured to said horizontal bar, a link connecting said crank member with the movable cutter bar, and a spring to co-act with said crank member in operating said movable cutter bar.

In testimony whereof I affix my signature.

MARIN M. SIMESCU.